United States Patent
Ogrinz

(10) Patent No.: US 10,439,913 B2
(45) Date of Patent: Oct. 8, 2019

(54) DYNAMIC REPLACEMENT AND UPGRADE OF EXISTING RESOURCES BASED ON RESOURCE UTILIZATION

(71) Applicant: BANK OF AMERICA CORPORATION, Charlotte, NC (US)

(72) Inventor: Michael Emil Ogrinz, Easton, CT (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 244 days.

(21) Appl. No.: 15/200,536

(22) Filed: Jul. 1, 2016

(65) Prior Publication Data

US 2018/0006899 A1    Jan. 4, 2018

(51) Int. Cl.
*H04L 12/26* (2006.01)
*H04L 12/24* (2006.01)
*H04L 29/08* (2006.01)

(52) U.S. Cl.
CPC ...... *H04L 43/0817* (2013.01); *H04L 41/5025* (2013.01); *H04L 67/12* (2013.01)

(58) Field of Classification Search
CPC ... H04L 41/145; H04L 67/12; H04L 43/0817; H04L 41/5025
USPC ....................................................... 709/224
See application file for complete search history.

(56) References Cited

U.S. PATENT DOCUMENTS

| | | |
|---|---|---|
| 5,377,309 A | 12/1994 | Sonobe et al. |
| 5,717,923 A | 2/1998 | Dedrick |
| 5,729,746 A | 3/1998 | Leonard |
| 5,761,648 A | 6/1998 | Golden et al. |
| 5,801,687 A | 9/1998 | Peterson et al. |
| 5,842,185 A | 11/1998 | Chancey et al. |
| 5,848,396 A | 12/1998 | Gerace |
| 5,870,770 A | 2/1999 | Wolfe |
| 5,907,830 A | 5/1999 | Engel et al. |
| 5,911,135 A | 6/1999 | Atkins |
| 5,933,811 A | 8/1999 | Angles et al. |
| 6,006,252 A | 12/1999 | Wolfe |
| 6,009,411 A | 12/1999 | Kepecs |
| 6,009,413 A | 12/1999 | Webber et al. |
| 6,018,627 A | 1/2000 | Iyengar et al. |
| 6,038,393 A | 3/2000 | Iyengar et al. |
| 6,041,309 A | 3/2000 | Laor |

(Continued)

FOREIGN PATENT DOCUMENTS

CN    104283967 A    1/2015

OTHER PUBLICATIONS

Guagliardo, Joseph C. et al., "Blockchain: Preparing for Disruption Like Its the 90s"; Mar. 14, 2016, retrieved fr; Mar. 14, 2016, retrieved from http://www.law360.com/articles/77120CVprint?section=ip.

(Continued)

*Primary Examiner* — Philip J Chea
*Assistant Examiner* — Wing Ma
(74) *Attorney, Agent, or Firm* — Michael A. Springs; Moore & Van Allen PLLC; James C. Edwards

(57) ABSTRACT

Performance data received from interrelated communication devices is analyzed to determine the current operating state of the device and based on the current operating state a variable associated with replacing the device is determined which is implemented in the determination of a dynamic user-specific replacement schedule for the interrelated communication devices.

13 Claims, 3 Drawing Sheets

(56) References Cited

U.S. PATENT DOCUMENTS

| | | |
|---|---|---|
| 6,055,573 A | 4/2000 | Gardenswartz et al. |
| 6,076,069 A | 6/2000 | Laor |
| 6,223,163 B1 | 4/2001 | Van Luchene |
| 6,263,351 B1 | 7/2001 | Wolfe |
| 6,282,567 B1 | 8/2001 | Finch, II et al. |
| 6,292,786 B1 | 9/2001 | Deaton et al. |
| 6,292,813 B1 | 9/2001 | Wolfe |
| 6,317,718 B1 | 11/2001 | Fano |
| 6,321,208 B1 | 11/2001 | Barnett et al. |
| 6,327,578 B1 | 12/2001 | Linehan |
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |
| 6,385,592 B1 | 5/2002 | Angles et al. |
| 6,434,534 B1 | 8/2002 | Walker et al. |
| 6,493,868 B1 | 12/2002 | DaSilva et al. |
| 6,505,168 B1 | 1/2003 | Rothman et al. |
| 6,553,563 B2 | 4/2003 | Ambrose et al. |
| 6,611,814 B1 | 8/2003 | Lee et al. |
| 6,615,184 B1 | 9/2003 | Hicks |
| 6,622,174 B1 | 9/2003 | Ukita et al. |
| 6,678,685 B2 | 1/2004 | McGill et al. |
| 6,782,370 B1 | 8/2004 | Stack |
| 6,829,232 B1 | 12/2004 | Takeda et al. |
| 6,851,107 B1 | 2/2005 | Coad et al. |
| 6,853,291 B1 * | 2/2005 | Aisa .................. H02J 13/0086 340/3.3 |
| 6,865,429 B1 | 3/2005 | Schneider et al. |
| 6,865,545 B1 | 3/2005 | Epstein et al. |
| 6,906,617 B1 * | 6/2005 | Van der Meulen .................. G01R 19/2513 340/12.39 |
| 6,925,444 B1 | 8/2005 | McCollom et al. |
| 6,937,995 B1 | 8/2005 | Kepecs |
| 6,980,973 B1 | 12/2005 | Karpenko |
| 7,024,374 B1 | 4/2006 | Day et al. |
| 7,043,526 B1 | 5/2006 | Wolfe |
| 7,096,193 B1 | 8/2006 | Beaudoin et al. |
| 7,099,832 B2 | 8/2006 | Walker et al. |
| 7,124,096 B2 | 10/2006 | Dutta et al. |
| 7,127,414 B1 | 10/2006 | Awadallah et al. |
| 7,127,713 B2 | 10/2006 | Davis et al. |
| 7,130,880 B1 | 10/2006 | Burton et al. |
| 7,162,443 B2 | 1/2007 | Shah |
| 7,181,488 B2 | 2/2007 | Martin et al. |
| 7,225,167 B2 | 5/2007 | Hind et al. |
| 7,231,357 B1 | 6/2007 | Shanman et al. |
| 7,236,942 B1 | 6/2007 | Walker et al. |
| 7,246,310 B1 | 7/2007 | Wolfe |
| 7,249,058 B2 | 7/2007 | Kim et al. |
| 7,254,548 B1 | 8/2007 | Tannenbaum |
| 7,257,604 B1 | 8/2007 | Wolfe |
| 7,299,007 B2 | 11/2007 | Eskin |
| 7,302,429 B1 | 11/2007 | Wanker |
| 7,302,638 B1 | 11/2007 | Wolfe |
| 7,315,834 B2 | 1/2008 | Martineau et al. |
| 7,324,965 B2 | 1/2008 | Martineau et al. |
| 7,340,419 B2 | 3/2008 | Walker et al. |
| 7,356,490 B1 | 4/2008 | Jacobi et al. |
| 7,386,477 B2 | 6/2008 | Fano |
| 7,398,248 B2 | 7/2008 | Phillips et al. |
| 7,412,604 B1 | 8/2008 | Doyle |
| 7,433,874 B1 | 10/2008 | Wolfe |
| 7,437,712 B1 | 10/2008 | Brown et al. |
| 7,464,050 B1 | 12/2008 | Deaton et al. |
| 7,472,088 B2 | 12/2008 | Taylor et al. |
| 7,490,056 B2 | 2/2009 | Nash |
| 7,512,551 B2 | 3/2009 | Postrel |
| 7,536,385 B1 | 5/2009 | Wolfe |
| 7,552,080 B1 | 6/2009 | Willard et al. |
| 7,578,435 B2 | 8/2009 | Suk |
| 7,593,862 B2 | 9/2009 | Mankoff |
| 7,599,850 B1 | 10/2009 | Laor |
| 7,606,736 B2 | 10/2009 | Martineau et al. |
| 7,644,390 B2 | 1/2010 | Khodabandehloo et al. |
| 7,694,291 B2 | 4/2010 | Chen et al. |
| 7,752,606 B2 | 7/2010 | Savage |
| 7,761,848 B1 | 7/2010 | Chaffin |
| 7,860,792 B1 | 12/2010 | Magruder et al. |
| 7,925,579 B1 | 4/2011 | Flaxman et al. |
| 8,001,519 B2 | 8/2011 | Conallen et al. |
| 8,042,178 B1 | 10/2011 | Fisher et al. |
| 8,234,194 B2 | 7/2012 | Mele et al. |
| 8,294,747 B1 | 10/2012 | Weinberg et al. |
| 8,301,558 B2 | 10/2012 | Marshall et al. |
| 8,316,237 B1 | 11/2012 | Felsher et al. |
| 8,327,351 B2 | 12/2012 | Paladino et al. |
| 8,392,912 B2 | 3/2013 | Davis et al. |
| 8,442,894 B2 | 5/2013 | Blackhurst et al. |
| 8,495,072 B1 | 7/2013 | Kapoor et al. |
| 8,560,106 B2 * | 10/2013 | Swyers ............. G05B 23/0283 700/106 |
| 8,930,265 B2 | 1/2015 | Blackhurst et al. |
| 8,964,113 B2 | 2/2015 | Kannermark et al. |
| 8,984,113 B2 | 3/2015 | Li et al. |
| 9,009,828 B1 | 4/2015 | Ramsey et al. |
| 9,032,077 B1 | 5/2015 | Klein et al. |
| 9,043,879 B1 | 5/2015 | Reeves et al. |
| 9,047,130 B2 | 6/2015 | Chen et al. |
| 9,104,189 B2 * | 8/2015 | Berges Gonzalez ... G01D 4/004 |
| 9,106,615 B2 | 8/2015 | Grossman |
| 9,338,181 B1 | 5/2016 | Burns et al. |
| 9,361,637 B2 * | 6/2016 | Coon ................. G06Q 30/0601 |
| 9,411,982 B1 | 8/2016 | Dippenaar et al. |
| 9,655,197 B1 * | 5/2017 | Coombes ............. H04W 88/16 |
| 9,693,296 B2 | 6/2017 | Wan et al. |
| 9,721,441 B2 * | 8/2017 | Lee ..................... H04W 4/021 |
| 9,743,272 B1 | 8/2017 | Ogrinz et al. |
| 9,775,131 B2 | 9/2017 | Winand et al. |
| 9,843,624 B1 | 12/2017 | Taaghol et al. |
| 9,866,697 B2 * | 1/2018 | Stepanian ............. G06F 1/1698 |
| 9,874,923 B1 * | 1/2018 | Brown .................... H04W 4/70 |
| 9,946,571 B1 * | 4/2018 | Brown ................. G06F 9/5005 |
| 9,995,501 B2 * | 6/2018 | Quam ...................... F24F 11/63 |
| 10,013,677 B2 * | 7/2018 | Jones ................. G06Q 10/20 |
| 2002/0032626 A1 | 3/2002 | DeWolf et al. |
| 2002/0049624 A1 | 4/2002 | Raveis, Jr. |
| 2002/0052803 A1 | 5/2002 | Amidhozour et al. |
| 2002/0062249 A1 | 5/2002 | Iannacci |
| 2002/0072975 A1 | 6/2002 | Steele et al. |
| 2002/0091571 A1 | 7/2002 | Thomas et al. |
| 2002/0095269 A1 * | 7/2002 | Natalini ............. H04L 12/2803 702/188 |
| 2002/0114433 A1 | 8/2002 | Katou et al. |
| 2002/0143564 A1 | 10/2002 | Webb et al. |
| 2002/0190118 A1 | 12/2002 | Davenport et al. |
| 2003/0115367 A1 | 6/2003 | Ohara |
| 2003/0135842 A1 | 7/2003 | Frey et al. |
| 2004/0010462 A1 | 1/2004 | Moon et al. |
| 2004/0122736 A1 | 6/2004 | Strock et al. |
| 2004/0192339 A1 | 9/2004 | Wilson et al. |
| 2004/0226995 A1 | 11/2004 | Smith |
| 2004/0230593 A1 | 11/2004 | Rudin et al. |
| 2004/0249768 A1 | 12/2004 | Kontio et al. |
| 2005/0015624 A1 | 1/2005 | Ginter et al. |
| 2005/0018686 A1 | 1/2005 | Igarashi et al. |
| 2005/0039053 A1 | 2/2005 | Walia |
| 2005/0075975 A1 | 4/2005 | Rosner et al. |
| 2005/0128969 A1 | 6/2005 | Lee et al. |
| 2005/0171845 A1 | 8/2005 | Halfman et al. |
| 2005/0173517 A1 | 8/2005 | Suk et al. |
| 2005/0177437 A1 | 8/2005 | Ferrier |
| 2005/0221842 A1 | 10/2005 | Kaneko et al. |
| 2005/0286079 A1 | 12/2005 | Takagi |
| 2005/0288955 A1 | 12/2005 | Lewis-Hachmeister |
| 2006/0151598 A1 | 7/2006 | Chen et al. |
| 2006/0217113 A1 | 9/2006 | Rao et al. |
| 2007/0005426 A1 | 1/2007 | Walker et al. |
| 2007/0092114 A1 | 4/2007 | Ritter et al. |
| 2007/0127470 A1 | 6/2007 | Gaedeken et al. |
| 2007/0136418 A1 | 6/2007 | Wolfe |

(56) References Cited

U.S. PATENT DOCUMENTS

| | | |
|---|---|---|
| 2007/0147320 A1 | 6/2007 | Sattari et al. |
| 2007/0233899 A1 | 10/2007 | Aborn |
| 2007/0240102 A1 | 10/2007 | Bello et al. |
| 2007/0255620 A1 | 11/2007 | Tumminaro et al. |
| 2007/0260532 A1 | 11/2007 | Blake, III |
| 2007/0299677 A1 | 12/2007 | Maertz |
| 2008/0008117 A1 | 1/2008 | Alizadeh-Shabdiz |
| 2008/0009268 A1 | 1/2008 | Ramer et al. |
| 2008/0021767 A1 | 1/2008 | Benson et al. |
| 2008/0040417 A1 | 2/2008 | Juncker |
| 2008/0091535 A1 | 4/2008 | Heiser, II et al. |
| 2008/0133336 A1 | 6/2008 | Altman et al. |
| 2008/0162224 A1 | 7/2008 | Coon et al. |
| 2008/0162316 A1 | 7/2008 | Rampell et al. |
| 2008/0192677 A1 | 8/2008 | Abusch-Magder et al. |
| 2008/0221986 A1 | 9/2008 | Soicher et al. |
| 2008/0228600 A1 | 9/2008 | Treyz et al. |
| 2008/0235130 A1 | 9/2008 | Malov et al. |
| 2008/0249936 A1 | 10/2008 | Miller et al. |
| 2008/0249941 A1 | 10/2008 | Cooper |
| 2008/0277465 A1 | 11/2008 | Pletz et al. |
| 2008/0289009 A1 | 11/2008 | Lee et al. |
| 2008/0301779 A1 | 12/2008 | Garg et al. |
| 2009/0006175 A1 | 1/2009 | Maertz |
| 2009/0043629 A1 | 2/2009 | Price |
| 2009/0094125 A1 | 4/2009 | Killian et al. |
| 2009/0122797 A1 | 5/2009 | Thubert et al. |
| 2009/0132366 A1 | 5/2009 | Lam et al. |
| 2009/0132415 A1 | 5/2009 | Davis et al. |
| 2009/0150238 A1 | 6/2009 | Marsh et al. |
| 2009/0170483 A1 | 7/2009 | Barnett et al. |
| 2009/0172728 A1 | 7/2009 | Shkedi et al. |
| 2009/0187436 A1 | 7/2009 | Shoen et al. |
| 2009/0187543 A1 | 7/2009 | Samborn |
| 2009/0271265 A1 | 10/2009 | Lay et al. |
| 2009/0292599 A1 | 11/2009 | Rampell et al. |
| 2009/0292647 A1 | 11/2009 | Porat et al. |
| 2009/0299865 A1 | 12/2009 | Budgen |
| 2009/0313106 A1 | 12/2009 | Taylor et al. |
| 2009/0316701 A1 | 12/2009 | Yoo et al. |
| 2009/0319638 A1 | 12/2009 | Faith et al. |
| 2010/0070525 A1 | 3/2010 | Clark et al. |
| 2010/0106568 A1 | 4/2010 | Grimes |
| 2010/0131395 A1 | 5/2010 | Allin et al. |
| 2010/0189227 A1 | 7/2010 | Mannar et al. |
| 2010/0250538 A1 | 9/2010 | Richards et al. |
| 2010/0274731 A1 | 10/2010 | Tsitsis |
| 2010/0306763 A1 | 12/2010 | Lambert et al. |
| 2010/0332251 A1 | 12/2010 | Yanak et al. |
| 2011/0040785 A1* | 2/2011 | Steenberg .......... G05B 23/0235 707/769 |
| 2011/0047597 A1 | 2/2011 | Mahaffey et al. |
| 2011/0087547 A1 | 4/2011 | Amaro et al. |
| 2011/0103392 A1 | 5/2011 | Fan et al. |
| 2011/0116442 A1 | 5/2011 | Caldwell et al. |
| 2011/0182280 A1 | 7/2011 | Charbit et al. |
| 2011/0191149 A1 | 8/2011 | Blackhurst et al. |
| 2011/0191150 A1 | 8/2011 | Blackhurst et al. |
| 2011/0191160 A1 | 8/2011 | Blackhurst et al. |
| 2011/0191173 A1 | 8/2011 | Blackhurst et al. |
| 2011/0191177 A1 | 8/2011 | Blackhurst et al. |
| 2011/0191180 A1 | 8/2011 | Blackhurst et al. |
| 2011/0191181 A1 | 8/2011 | Blackhurst et al. |
| 2011/0191184 A1 | 8/2011 | Blackhurst et al. |
| 2011/0191238 A1 | 8/2011 | Blackhurst et al. |
| 2011/0238499 A1 | 9/2011 | Blackhurst et al. |
| 2011/0238550 A1 | 9/2011 | Reich et al. |
| 2011/0270773 A1 | 11/2011 | Siekman et al. |
| 2011/0302201 A1* | 12/2011 | Ogaz .................... G06Q 30/02 707/769 |
| 2012/0016803 A1 | 1/2012 | Tharp |
| 2012/0028635 A1 | 2/2012 | Borg et al. |
| 2012/0030092 A1 | 2/2012 | Marshall et al. |
| 2012/0078996 A1* | 3/2012 | Shah .................... H04L 67/325 709/203 |
| 2012/0180024 A1 | 7/2012 | Gonzalez et al. |
| 2012/0190386 A1 | 7/2012 | Anderson |
| 2012/0190455 A1 | 7/2012 | Briggs |
| 2012/0226605 A1 | 9/2012 | Veerubhotla |
| 2012/0290230 A1* | 11/2012 | Berges Gonzalez ... G01D 4/004 702/61 |
| 2013/0006813 A1* | 1/2013 | Carlin .................. G06Q 10/06 705/26.61 |
| 2013/0046626 A1 | 2/2013 | Grigg et al. |
| 2013/0079931 A1* | 3/2013 | Wanchoo ............... G01D 4/002 700/278 |
| 2013/0096857 A1* | 4/2013 | Chakradhar ........... G01D 4/002 702/61 |
| 2013/0110621 A1* | 5/2013 | Gupta .................... G01R 31/34 705/14.52 |
| 2013/0132854 A1 | 5/2013 | Raleigh et al. |
| 2013/0185558 A1 | 7/2013 | Seibert et al. |
| 2013/0223340 A1 | 8/2013 | Jeong |
| 2013/0260682 A1 | 10/2013 | Suzuki et al. |
| 2013/0298242 A1 | 11/2013 | Kumar et al. |
| 2013/0307702 A1* | 11/2013 | Pal ...................... A47L 15/0047 340/870.02 |
| 2014/0006529 A1 | 1/2014 | Andreoli-Fang et al. |
| 2014/0047322 A1 | 2/2014 | Kim et al. |
| 2014/0068721 A1 | 3/2014 | Ong et al. |
| 2014/0095666 A1 | 4/2014 | Yampanis |
| 2014/0115324 A1 | 4/2014 | Buer |
| 2014/0136623 A1 | 5/2014 | Kvache et al. |
| 2014/0226010 A1 | 8/2014 | Molin et al. |
| 2014/0244834 A1 | 8/2014 | Guedalia et al. |
| 2014/0278629 A1 | 9/2014 | Stephenson et al. |
| 2014/0344128 A1 | 11/2014 | Nikankin et al. |
| 2015/0002271 A1 | 1/2015 | Lee et al. |
| 2015/0013001 A1* | 1/2015 | Lee ...................... H04L 63/0823 726/15 |
| 2015/0043516 A1 | 2/2015 | Liu et al. |
| 2015/0081837 A1 | 3/2015 | Bernier et al. |
| 2015/0081860 A1* | 3/2015 | Kuehnel ............... H04L 41/0806 709/222 |
| 2015/0094026 A1 | 4/2015 | Martin |
| 2015/0094093 A1 | 4/2015 | Pierce et al. |
| 2015/0095478 A1* | 4/2015 | Zuerner ................. H04L 67/12 709/223 |
| 2015/0154012 A1 | 6/2015 | Wolfram |
| 2015/0221039 A1 | 8/2015 | Johansson |
| 2015/0227406 A1 | 8/2015 | Jan et al. |
| 2015/0293574 A1 | 10/2015 | Ehsan et al. |
| 2015/0294553 A1* | 10/2015 | Logan .................. G05B 19/042 340/539.1 |
| 2015/0312348 A1* | 10/2015 | Lustgarten ............ H04L 67/12 705/14.66 |
| 2015/0327071 A1 | 11/2015 | Sharma et al. |
| 2015/0358317 A1 | 12/2015 | Deutschman et al. |
| 2016/0057051 A1 | 2/2016 | McAndrew et al. |
| 2016/0065628 A1 | 3/2016 | Guo et al. |
| 2016/0071334 A1 | 3/2016 | Johnson et al. |
| 2016/0087933 A1 | 3/2016 | Johnson et al. |
| 2016/0110811 A1 | 4/2016 | Siu et al. |
| 2016/0132832 A1 | 5/2016 | Pinkovezky et al. |
| 2016/0163130 A1* | 6/2016 | Zagajac ................ G07C 5/0808 701/29.1 |
| 2016/0164919 A1 | 6/2016 | Satish et al. |
| 2016/0205599 A1 | 7/2016 | Zhang et al. |
| 2016/0210450 A1 | 7/2016 | Su |
| 2016/0217282 A1 | 7/2016 | Vecera et al. |
| 2016/0232336 A1 | 8/2016 | Pitschel et al. |
| 2016/0269411 A1 | 9/2016 | Malachi |
| 2016/0295410 A1 | 10/2016 | Gupta et al. |
| 2016/0300201 A1 | 10/2016 | Li et al. |
| 2016/0328282 A1 | 11/2016 | Rogati et al. |
| 2016/0337869 A1 | 11/2016 | Dai et al. |
| 2016/0342982 A1 | 11/2016 | Thomas et al. |
| 2016/0343078 A1 | 11/2016 | Vaidyanathan et al. |
| 2016/0367415 A1 | 12/2016 | Hayes et al. |
| 2017/0003960 A1 | 1/2017 | Subramanian et al. |
| 2017/0004508 A1* | 1/2017 | Mansfield ............. G06Q 30/012 |
| 2017/0006135 A1* | 1/2017 | Siebel .................... H04L 67/02 |
| 2017/0017354 A1* | 1/2017 | Wei ....................... G06F 3/0482 |

(56) References Cited

U.S. PATENT DOCUMENTS

| | | |
|---|---|---|
| 2017/0041296 A1 | 2/2017 | Ford et al. |
| 2017/0061442 A1 | 3/2017 | Barlow et al. |
| 2017/0076408 A1* | 3/2017 | D'Souza ................ G06Q 40/00 |
| 2017/0122615 A1 | 5/2017 | Tang |
| 2017/0124642 A1 | 5/2017 | Barnett et al. |
| 2017/0171513 A1 | 6/2017 | Nakamura |
| 2017/0178186 A1* | 6/2017 | Craft ................ G06Q 30/0255 |
| 2017/0208079 A1 | 7/2017 | Cammarota et al. |
| 2017/0208139 A1* | 7/2017 | Li ............................ H04L 67/16 |
| 2017/0213451 A1* | 7/2017 | Potucek ............... A61H 33/005 |
| 2017/0228773 A1 | 8/2017 | Takayama |
| 2017/0235454 A1 | 8/2017 | Selfridge et al. |
| 2017/0244618 A1 | 8/2017 | DeLuca et al. |
| 2017/0256157 A1 | 9/2017 | Johan et al. |
| 2017/0278133 A1 | 9/2017 | Corrado et al. |
| 2017/0280459 A1* | 9/2017 | Ogrinz .................. H04W 76/10 |
| 2017/0302669 A1* | 10/2017 | Chen ....................... H04L 63/10 |
| 2017/0323345 A1 | 11/2017 | Flowers et al. |
| 2017/0332228 A1 | 11/2017 | Oda |
| 2017/0352071 A1* | 12/2017 | Carey ................. G06Q 30/0283 |
| 2017/0353859 A1* | 12/2017 | Idnani ................... H04W 12/08 |
| 2017/0366422 A1 | 12/2017 | Castinado et al. |
| 2017/0374583 A1* | 12/2017 | Ogrinz .............. H04W 36/0016 |
| 2018/0007131 A1* | 1/2018 | Cohn .................. H04L 67/1068 |
| 2018/0295517 A1 | 10/2018 | Bicket et al. |
| 2019/0179300 A1* | 6/2019 | Cella .................. G05B 23/0294 |

OTHER PUBLICATIONS

Guagliardo, Joseph C. et al., "Blockchain: Preparing for Disruption Like Its the 90s"; Mar. 14, 2016, retrieved from http://www.law360.com/articles/77120CVprint?section=ip.

International Preliminary Report on Patentability (IPRP) dated Jul. 31, 2012 for International Application No. PCT/US2011/022765.

International Search Report and the Written Opinion of the International Searching Authority dated Mar. 25, 2011 for International Application No. PCT/US11/22781.

International Search Report and the Written Opinion of the International Searching Authority dated Mar. 25, 2011 for International Application No. PCT/US11/22783.

International Search Report and the Written Opinion of the International Searching Authority dated Mar. 28, 2011 for International Application No. PCT/US11/22771.

International Search Report and the Written Opinion of the International Searching Authority dated Mar. 29, 2011 for International Application No. PCT/US11/22779.

International Search Report and the Written Opinion of the International Searching Authority dated Mar. 29, 2011 for International Application No. PCT/US11/22785.

International Search Report and the Written Opinion of the International Searching Authority dated Apr. 8, 2011 for International Application No. PCT/US11/22765.

Friedman, Jack P., Dictionary of Business Terms, 2000, Barron's Educational Series, Inc., 3rd edition, 225.

* cited by examiner

DYNAMIC REPLACEMENT AND UPGRADE OF EXISTING RESOURCES BASED ON RESOURCE UTILIZATION

FIELD OF THE INVENTION

The present invention related to data communication amongst a system of interrelated computing devices and, more specifically, receiving performance data captured from sensors of interrelated communication devices and, based on the performance data, determining a current operating state of the device, variables associated with replacing the device based on the current operating state and a replacement schedule by applying the first variable to a first fixed rate that is associated with a same one of the one or more interrelated communication devices as a corresponding first variable.

BACKGROUND

Systems for providing communications between and amongst devices are known where interrelated computing devices, often referred to as smart devices, may include communications modules, processors and applications that allow the devices to communicate with one another, and with other devices and/or systems, over a network. Such systems allow the devices to collect and exchange data and are commonly referred to as the Internet-of-Things (IoT).

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, for receiving performance data from sensors associated with interrelated communication devices, such that the performance data is analyzed to determine to determine a current operating state of each device and, based on the current operating state determine (i) a variable associated with replacing each of the devices and (ii) a replacement schedule by applying the variable to a first fixed rate that is associated with the same interrelated communication device. In specific embodiments of the invention determining the replacement schedule may include determining at least one of a predicted time for replacing the interrelated communication device and/or a replacement amount.

In specific embodiments of the invention, analyzing the performance data may include analyzing the performance data to predict a useful remaining life for each of the interrelated communication devices. In such embodiments of the invention, the predicted useful remaining life of the device may be the basis for determining the first variable. In other related embodiments of the invention, the predicted useful remaining life of the device may be the basis for determining a time for determining the first variable and a time for determining the replacement schedule.

In other embodiments of the invention, analyzing the performance data may include analyzing the performance data to the current operating state of the devices in relation to a period of time that the devices have been in use. In such embodiments of the invention, a second variable may be determined that is associated with warranting the device based on the current operating state of the device in relation to its period of use and a warranty rate may be determined by applying the second variable to a second fixed rate associated with the same device as the second variable. In other related embodiments of the invention, a third variable is determined that is associating with warranting a replacement device for the interrelated communication device based on the current operating state of the device in relation to its period of use and a second warranty rate for the replacement device determined by applying the third variable to a third fixed rate associated with the same device as the third variable.

In still further embodiments of the invention, the performance data is analyzed over time to determine a performance trend for the interrelated communication device and, based on the performance trend, the variable associating with replacing the device is determined.

A system for analyzing performance data from interrelated communication devices defines first embodiments of the invention. The system includes a computer platform including, a memory, a processor in communication with the memory and a network communication device in communication with the processor. The system further includes a device performance analysis module that is stored in the memory and executable by the processor. The module is configured for communicating with a plurality of interrelated communication devices across a distributed computing network. Each of the interrelated computing devices include at least one sensor that captures performance data and communicates the performance data via the distributed network. The module is further configured for receiving performance data communicated from the one or more of the interrelated communication devices, and analyzing the performance data to determine a current operating state of each of the one or more interrelated communication devices. The system further includes a schedule determining module that is configured for determining a first variable, associated with replacing each of the interrelated communication devices, for each of the one or more interrelated communication devices based on the determined current operating state of each of the one or more interrelated communication devices and determining a replacement schedule for replacing each of the one or more interrelated communication devices by applying the first variable to a first fixed rate that is associated with a same one of the one or more interrelated communication devices as a corresponding first variable.

In specific embodiments of the system, the device performance analysis module is further configured for analyzing the performance data to predict a useful life period for each of the one or more interrelated communication devices. In such embodiments of the system, the replacement schedule module is further configured for determining the first variable based on the predicted useful life period for each of the one or more interrelated communication devices. In other related embodiments of the system, the replacement schedule module is further configured for determining a first time for determining the first variable and a second time for determining the replacement schedule based on the predicted useful life period for each of the one or more interrelated communication devices.

In other specific embodiments of the system, the device performance analysis module is further configured for analyzing the performance data to determine the current operating state of each of the one or more interrelated communication devices in relation to a period of time that each of the one or more interrelated communication devices have been in use. In related embodiments the system includes a warranty module that is configured for determining a second variable, associated with warranting each of the devices, for each of the one or more interrelated communication devices based on the determined current operating state of each of the one or more interrelated communication devices in relation to the period of time, and determining a first warranty rate for warranting each of the one or more interrelated communication devices by applying the second variable to a second fixed rate. The second fixed rate is associated with a same one of the one or more interrelated communication devices as a corresponding second variable. In other related embodiments of the system, the warranty module is further configured for determining a third variable, associated with warranting a replacement device, for each of the one or more interrelated communication devices based on the determined current operating state of each of the interrelated communication devices in relation to the period of time, and determining a second warranty rate for warranting a replacement device for each of the one or more interrelated communication devices by applying the third variable to a third fixed rate. The third fixed rate is associated with a same one of the one or more interrelated communication devices as a corresponding third variable.

In still further specific embodiments of the system, the device performance analysis module is further configured for analyzing the performance data over time to determine a performance trend for each of the one or more interrelated communication devices and the replacement schedule module is further configured for determining the first variable, associated with replacing each of the interrelated communication device, for each of the one or more interrelated communication devices based on the determined performance trend of each of the one or more interrelated communication devices.

Moreover, in further specific embodiments of the system, replacement schedule module is further configured for determining the replacement schedule that includes a predicted time for replacing a corresponding one of the one or more interrelated communication devices and a replacement amount by applying the first variable to the first fixed rate.

A method for analyzing performance data from interrelated communication devices defines second embodiments of the invention. The method includes communicating with a plurality of interrelated communication devices across a distributed computing network. Each of the interrelated computing devices include at least one sensor that captures performance data and communicates the performance data via the distributed network. The method further includes receiving performance data communicated from the one or more of the interrelated communication devices and analyzing the performance data to determine a current operating state of each of the one or more interrelated communication devices. The method further includes determining a first variable for each of the one or more interrelated communication devices based on the determined current operating state of each of the one or more interrelated communication devices. The first variable is associated with replacing each of the interrelated communication devices, In addition, the method includes determining a replacement schedule for replacing each of the one or more interrelated communication devices by applying the first variable to a first fixed rate. The first fixed rate is associated with a same one of the one or more interrelated communication devices as a corresponding first variable.

A computer program product for analyzing performance data from interrelated communication devices including a non-transitory computer-readable storage medium defines third embodiments of the invention. The computer-readable medium includes computer-executable instructions for communicating with a plurality of interrelated communication devices across a distributed computing network. Each of the interrelated computing devices include at least one sensor that captures performance data and communicates the performance data via the distributed network. The computer-executable instructions further include instructions for receiving performance data communicated from the one or more of the interrelated communication devices and analyzing the performance data to determine a current operating state of each of the one or more interrelated communication devices. The computer-executable instructions further include instructions for determining a first variable for each of the one or more interrelated communication devices based on the determined current operating state of each of the one or more interrelated communication devices. The first variable is associated with replacing each of the interrelated communication devices. In addition, the computer-executable instructions further include instructions for determining a replacement schedule for replacing each of the one or more interrelated communication devices by applying the first variable to a first fixed rate. The first fixed rate is associated with a same one of the one or more interrelated communication devices as a corresponding first variable.

Thus, systems, apparatus, methods, and computer program products herein described in detail below provide for analyzing performance data received from interrelated communication devices, such as devices interconnected via IoT, and based on the performance data determining a variable associated with replacing the device, warranting the device and/or warranting the replacement device. Based on the replacement variable, a dynamic user-specific replacement schedule is determined that takes into account a time for replacing the device and/or an amount associated with replacing the device. Further, based on the warranty variable, dynamic user-specific warranty rates are determined, for the existing device and/or replacement device, which takes into account the current operating state of the device in relation to how the device has been in use.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
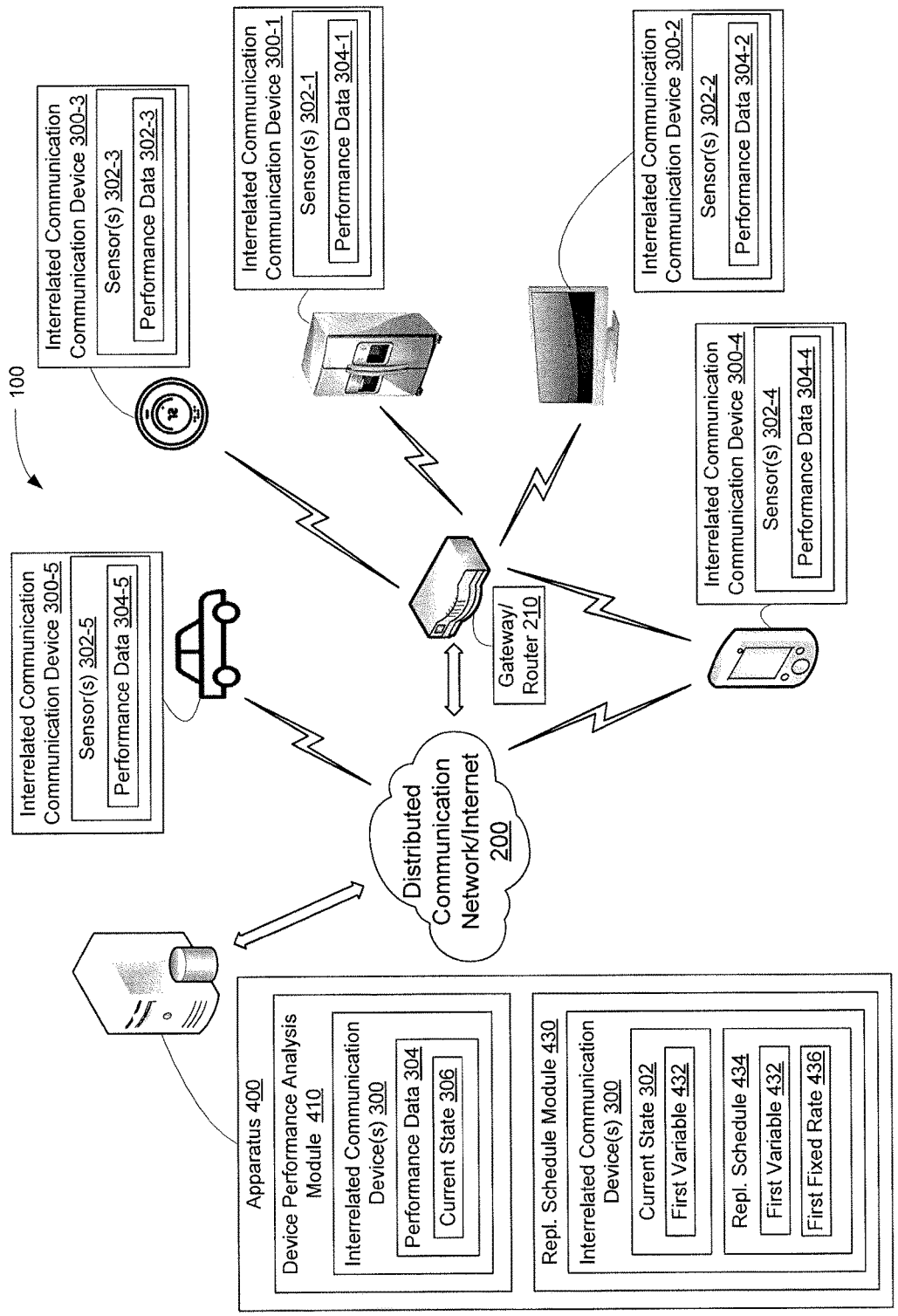
Figure 2:
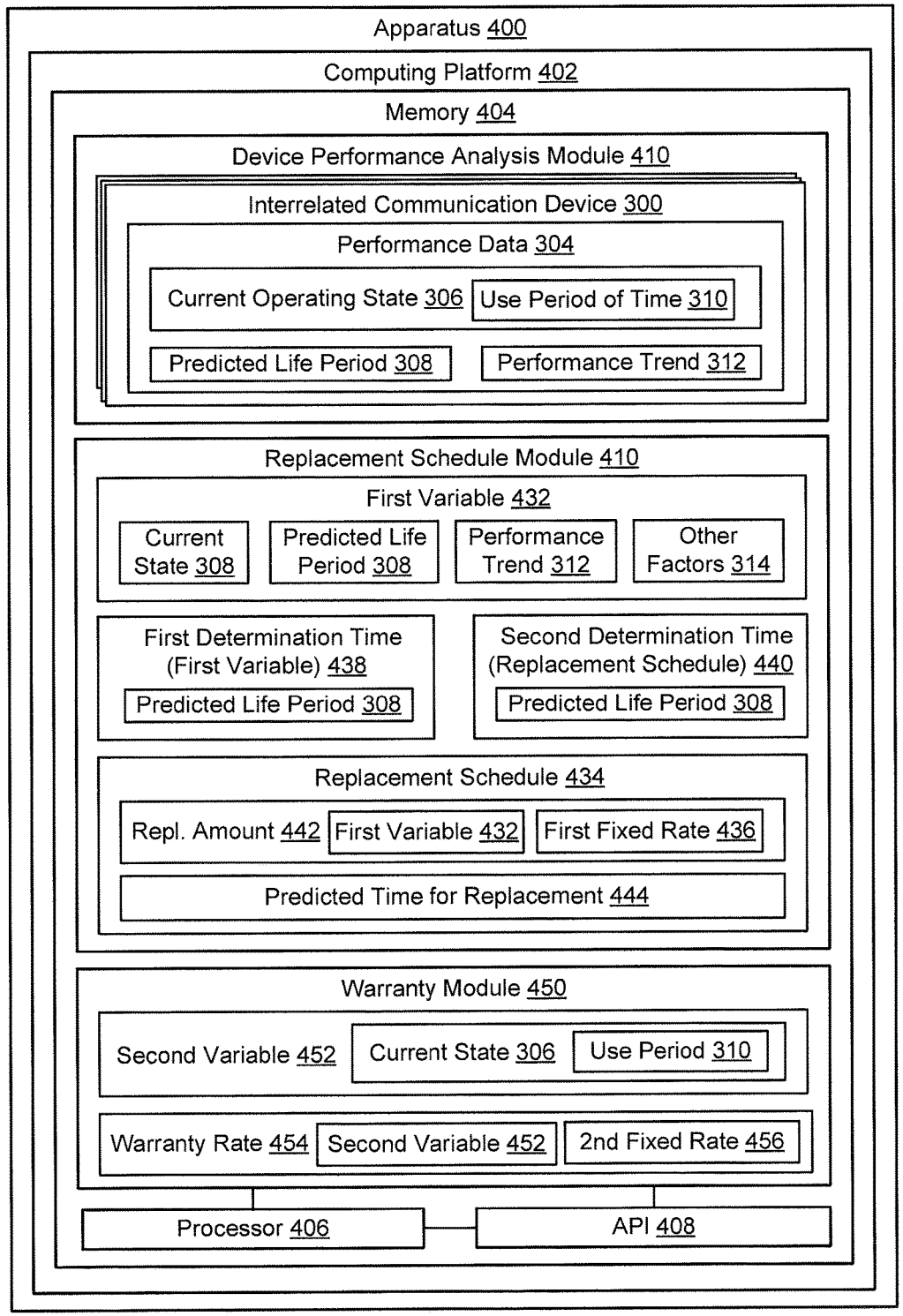
Figure 3:
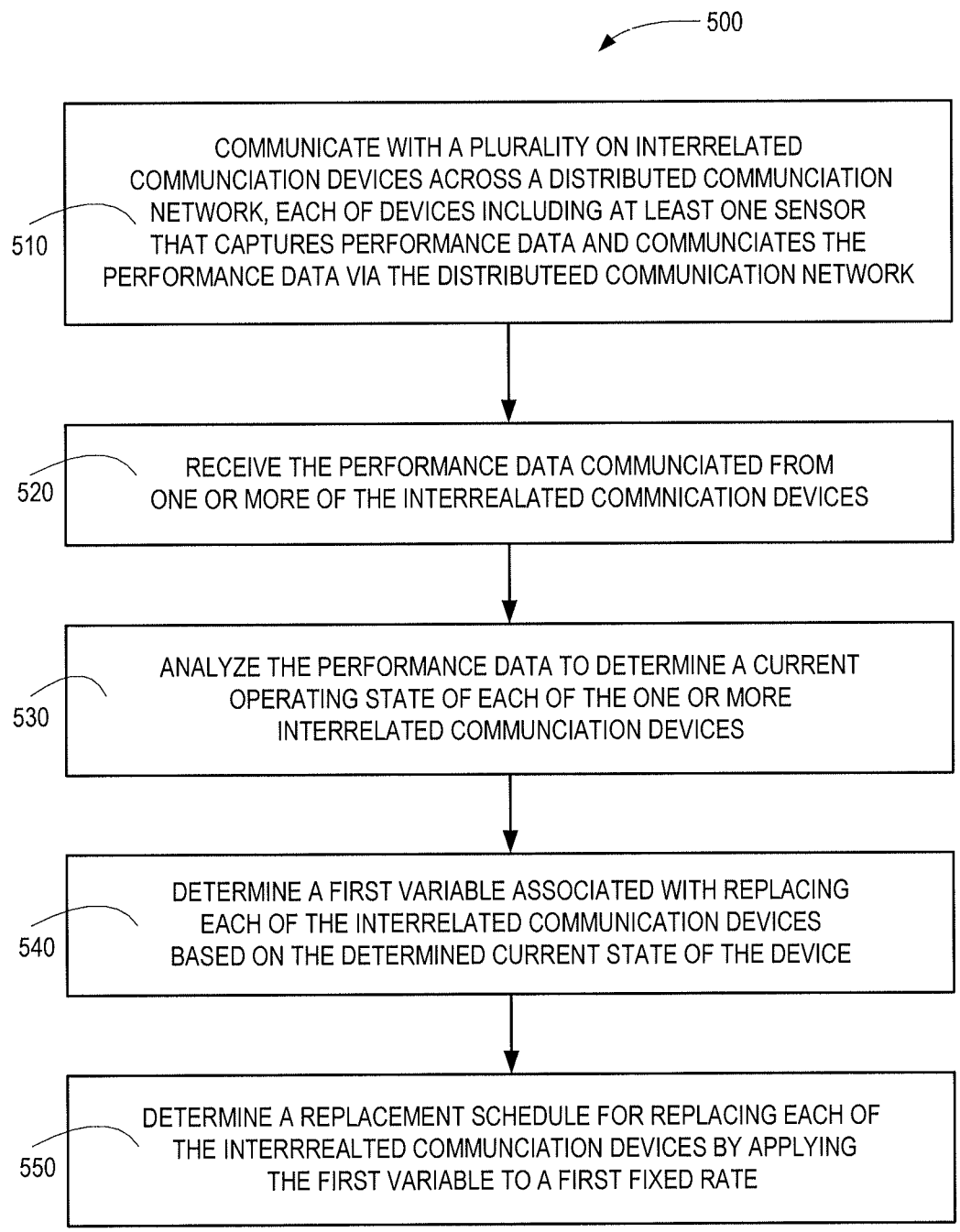

Having thus described embodiments of the invention in general terms, reference will now be made the accompanying drawings, wherein:

FIG. 1 provides a schematic diagram of an exemplary system for dynamic determination of a replacement schedule based on the current operating state of interrelated communication devices, in accordance with embodiments of the present invention;

FIG. 2 provides a block diagram of an apparatus for dynamic determination of a replacement schedule and warranty rates based on the current operating state of interrelated communication devices, in accordance with embodiments of the present invention; and FIG. 3 provides a flow diagram of a method system for dynamic determination of a replacement schedule based on the current operating state of interrelated communication devices, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Many of the example implementations discussed and contemplated herein involve at least one interrelated communication device, otherwise referred to as a "smart device". An interrelated communication device as used herein means a device, apparatus and/or system that is capable of communicating with and transmitting information or data to and/or receiving information or data from other devices, systems or apparatuses including over a network. The interrelated communication device may be for example, but not limited to, a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as mobile communication devices, wearable devices such as internet capable fitness devices, watches, glasses or the like. The list of interrelated communication devices provided herein is not exhaustive such that the device may be any device that includes a communication interface or module, software and/or hardware that allow the device to communicate data and/or information related to the device with other devices and/or systems over a network.

In accordance with embodiments of the invention, the term "user" refers to and includes any individual, organization, entity, or group thereof, that are own, possess or are otherwise associated with an interrelated communication device. In many example implementations, particularly those that arise in the context of a home environment, a user will be the owner of the device. In other example implementations, such as those that arise in the context of a manufacturing facility, information technology (IT) facility, restaurant or food processing facility, and/or other business enterprise settings, a user may be the organization, business or the like.

In some embodiments of the invention, an "entity" as used herein may be a provider of an interrelated communication device, such as a retailer or a financier or a warrantor of an interrelated communication device, such as a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like.

Many of the embodiments and example implementations thereof described herein are directed toward solving a pervasive technical problem that consumers at all levels, from individuals to global enterprises, have suffered without reprieve, namely, that critical systems often fail at inopportune times. Moreover, the costs associated with the emergency and/or ad hoc repair, replacement, and other remediation of unanticipated system failures are often much higher (monetarily, and in terms of time, convenience, stress, and other factors impacting individuals and businesses) than timed replacement, targeted repairs, or other interventions that prevent, delay, or mitigate system failure. Examples of such system failure can be highly problematic, such as the failure of HVAC systems during exceptionally hot or cold weather events, the unanticipated failure of critical IT components such as servers and the like, the failure of plumbing components during an extended travel period, vehicle failure on the way to an important meeting, and other unanticipated system failures that impede or impact the normal functioning of an individual, household, or business. While the use of back-up systems (such as emergency generators in the case of electrical systems, fans or space heaters in the case of HVAC systems, and the like) may allow for some limited mitigation of otherwise catastrophic system failure, such back-up systems are often expensive, prone to failure themselves, or otherwise inconvenient. Moreover, the costs of emergency service are often much higher than those associated with normal, scheduled service. Furthermore, when catastrophic system failure mandates the immediate replacement of failed components, it is often impossible to take the time to carefully select replacement components that satisfactorily meet all of the functional, aesthetic, pricing, and other requirements that would be imposed on a planned replacement purchase.

To solve this technical issue and related technical issues, many of the embodiments and example implementations contemplated herein recognize that an interrelated communication device, including one or more sensors, may be configured to communicate information about the performance of the device (i.e., performance data) that will allow, through data analysis, for the identification of the current operating state of the device, as well as predicting the future life period of the device (e.g., prediction of a stage in failure that a smart device may be in or will be in at a future point in time). Moreover, as the performance data is routinely communicated, over time, the historical performance data allows for performance trends to be determined. For example, an interrelated communication device may be configured to communicate a usage pattern or profile, in the sense that the device may transmit information about when the device is turned on or off, the power consumption of the device, information about the use cycles of the device (such as the number of cycles performed, the duration of cycles, or other such information, for example), the age and/or service life of the device, or other data generated regarding the use and operation of the smart device. In situations where the interrelated communication device is able to run self-diagnostic protocols, such as HVAC systems, server systems, or other systems that are equipped to check the functioning of their various component parts and generate diagnostic codes, the smart device may be configured to communicate such diagnostic codes. Such information about the interrelated communication device and its functionality can be particularly useful in diagnosing and predicting whether the smart device is likely in need of maintenance, repair, and/or replacement, and when maintenance, repair, and/or replacement may be necessary in the future.

In accordance with embodiments of the present invention, once the current operating state, predicted remaining useful like and/or performance trends of an interrelated communication device is known, an entity, such as a retailer, financial institution or the like can use this information, along with any other information related to the user, to determine a replacement variable that is associated with at least one of (i) the current operating state, (ii) predicted remaining useful like and/or (iii) performance trend. Once the replacement variable has been determined it is applied to a fixed rate to render a replacement rate/amount, at which a replacement device may be offered to the user. The replacement rate, along with a predicted time for replacement are components of a herein described replacement schedule.

In accordance with other embodiments of the invention, in addition to using performance data to determine replacement schedules, performance data may also be used to determine warranty rates to be offered to the user for the existing interrelated communication device (based on the current operating state of the device and the current use period of the device), as well as determine warrant rates to be offered to the user for a replacement device (based on the actual or predicted useful life of the existing interrelated communication device).

Referring to FIG. 1, a schematic diagram is provided of a system 100 for dynamic determination of a replacement schedule for replacing existing interrelated communication devices (e.g., IoT devices), in accordance with embodiments of the present invention. The system 100 is implemented in a distributed communication environment via computing network 200, which typically comprises the Internet and may include various sub-nets and/or intranets. System 100 includes apparatus 400 which stores device performance analysis module 410, which is configured to perform analysis on performance data 304 received from the interrelated communication devices 300 to determine the current operating state 302 of the associated interrelated communication device 300.

As previously discussed, the interrelated communication devices 300 may be devices located within an user's domicile/residence or place of business, which connect to the distributed communication network 200 via a gateway device 210, otherwise referred to herein as a router device. The connection between the gateway/router 210 and the interrelated communication devices 300-1, 300-2, 300-3 and 300-4 may be wireless, as shown in FIG. 1, or in other instances the connection may be a physical/wired connection. The interrelated communication devices include one or more sensors 302 that are configured to capture performance data 304 related to the performance of the associated interrelated communication device 300. The performance data 304 may include specific self-diagnostic data, such as acquired by an automobile, and/or household appliances or the performance data 304 may include data that indicates the period of device usage (i.e., how many minutes, hours and the like the device has been in use). In addition, the performance data 304 may include other data associated with performance, such as operating temperatures, energy consumption, rate of consumption of replaceable sub-components and the like.

In the illustrated embodiment of FIG. 1, the interrelated communication devices 300 include a smart thermostat 300-2, a refrigerator 300-1, a television 300-2, a smart thermostat 300-3 and a mobile device/smart telephone 300-4, all of which may reside within a user's residence and communicate with the gateway/router 210 as the entry point to the distributed communication network 200. Additionally, the mobile device/smart telephone 300-4 and a vehicle 300-5 may be configured to communicate with the distributed communication network 200 directly (i.e., absent the gateway/router 210), such as through a cellular network (not shown in FIG. 1) or the like. It should be noted performance data 304 from other interrelated communication devices may be received and analyzed by the device performance module 410 to determine the current operating state 302 of the interrelated communication device being considered for replacement. For example, the smart thermostat 300-3 may capture performance data 302 that indicates the operating environment (e.g., temperature, humidity and the like) of the other interrelated communication devices (e.g., refrigerator 302-1, television 300-2 or the like) in the confines of the building associated with the smart thermostat 300-3. The operating environment may be instrumental in determining if the interrelated communication devices have been operating in an ideal or less than ideal environment (e.g., temperature patterns indicate that the devices have been operating in a harsh temperature environment outside of the prescribed temperature environment for the device).

The current operating state 302 may define a level or a numerical value that indicates the current condition of the interrelated communication device 300. In specific embodiments of the invention, the current operating state 302 takes into account the usage amount/period of time associated with the device (i.e., the frequency of use and/or the actual period of time that the device has been use and/or the current life of the device). In this regard, the current operating state 302 may be elevated in level or numeric value if the device is in otherwise average condition but the device has experienced a high frequency of use or a prolonged usage period; indicative of the user properly maintaining the device over time). Conversely, the current operating state 302 may be lowered in level or numeric value if the device is in average condition but the device has either been used infrequently or has a minimal use period.

Apparatus 400 additionally stores replacement schedule module 430 that is configured to determine a replacement schedule 434 (e.g., replacement rate/amount and/or time for replacement) based on the current operating state 302 of the interrelated communication device 300. According to embodiments of the invention, the replacement schedule module 430 is configured to determine a first variable 432 based at least on the current operating state 302 of the interrelated communication device 300. The first variable 432 is subsequently applied to a first fixed rate 436 to determine at least component of the replacement schedule 434. In specific embodiments the invention, the first variable is applied to the fixed rate to determine the dynamic user-specific replacement rate/amount that may be afforded to the user. As such, the first variable may define the variance (percentage or the like) in the replacement rate/amount that may be afforded the user based at least on the current operating state 302 of the interrelated communication device 300. For example, if the current operating state 302 indicates harsher than normal use of the interrelated communication device, a lower first variable 432 (or negative variable) may be determined, resulting in a lower replacement rate/amount (assuming that harsher use results in more frequent replacements of the interrelated communication device) and if the current operating state 302 indicates more moderate than normal use of the interrelated communication device, a higher first variable 432 (or positive variable) may be determined, resulting in higher replacement rate/amount (assuming that moderate use; less wear and tear, results in less frequent replacement(s) of the interrelated communication device).

Other factors/attributes, in addition to the current operating state 302 of the interrelated communication device 300, may be taken into account in determining the first variable 432. Other factors may be related to the interrelated communication device, the environment in which the device operates, the user, user demographics and the like. In such embodiments of the invention, the other factors related to the interrelated communication may include, but are not limited to, the make, model, year of manufacturer of the device, as well as performance history of the make and/or model. Other factors related to the operating environment may include, but are not limited to, physical address, temperature profiles, number of users and the like. Additionally, other factors related to the user may include, but are not limited to, profile data, such as financial institution-related profile data; transaction data (i.e., previous purchase history of similar devices and the like) and other factors associated with user demographics, which may include similar replacement buying patterns of similarly situated/profiled users. Such information may be communicated via the interrelated communication device 300 or may be accessed/communicated from other databases accessible via the distributed communication network 200.

Referring to FIG. 2 a block diagram is presented of the apparatus 400, which is configured for determining a replacement schedules and/or warranty rates based on performance data received from interrelated communication devices, in accordance with embodiments of the present invention. In addition to providing greater detail, FIG. 2 highlights various alternate embodiments of the invention. The apparatus 400 may include one or more of any type of computing device, such as one or more servers, personal computers or the like. The present apparatus and methods can accordingly be performed on any form of one or more computing devices.

The apparatus 400 includes a computing platform 402 that can receive and execute algorithms, such as routines, and applications. Computing platform 402 includes memory 404, which may comprise volatile and non-volatile memory, such as read-only and/or random-access memory (RAM and ROM), EPROM, EEPROM, flash cards, or any memory common to computer platforms. Further, memory 404 may include one or more flash memory cells, or may be any secondary or tertiary storage device, such as magnetic media, optical media, tape, or soft or hard disk. Moreover, memory 404 may comprise cloud storage, such as provided by a cloud storage service and/or a cloud connection service.

Further, computing platform 402 also includes processor 406, which may be an application-specific integrated circuit ("ASIC"), or other chipset, processor, logic circuit, or other data processing device. Processor 406 or other processor such as ASIC may execute an application programming interface ("API") 408 that interfaces with any resident programs, such as device performance module 410, replacement schedule module 430 and/or warranty module 450 and routines, sub-modules associated therewith or the like stored in the memory 404 of the apparatus 400.

Processor 406 includes various processing subsystems (not shown in FIG. 2) embodied in hardware, firmware, software, and combinations thereof, that enable the functionality of apparatus 400 and the operability of the apparatus 400 on a network. For example, processing subsystems allow for initiating and maintaining communications and exchanging data with other networked devices, such as those interrelated communication devices shown in FIG. 1. For the disclosed aspects, processing subsystems of processor 406 may include any subsystem used in conjunction with device performance module 410, replacement schedule module 430 and/or warranty module 450 and related algorithms, sub-algorithms, modules, sub-modules thereof.

Computer platform 402 may additionally include communications module (not shown in FIG. 2) embodied in hardware, firmware, software, and combinations thereof, that enables communications among the various components of the apparatus 400, as well as between the other networked devices. Thus, communication module may include the requisite hardware, firmware, software and/or combinations thereof for establishing and maintaining a network communication connection.

The memory 404 of apparatus 400 stores device performance module 410 which is configured to receive performance data 304 from interrelated communication devices 300 and, based on the performance data 304, determine the current operating state 306 of the devices 300. As previously discussed in relation to FIG. 1, the current operating state 302 may define a level or a numerical value that indicates the current condition of the interrelated communication device 300. In specific embodiments of the invention, the current operating state 302 takes into account the usage amount/period of time 310 associated with the device (i.e., the frequency of use and/or the actual period of time that the device has been use and/or the current life of the device). For example, as previously noted, the usage period of time 310 may be used to increase or decrease the level or numeric value assigned to the current operating state 302 if the device has experienced higher or lower frequency of use and/or period of use 310.

In other embodiments of the invention, the performance data 304 may be analyzed by the device performance module 410 used to predict the remaining life period 308 of the device (i.e., how much longer the device is predicted to remain in use). In such embodiments of the invention, the device performance module 410 may not only rely on the performance data 304 but also rely on data associated with the devices 300, such as, but not limited to, the make, model and/or year of manufacturer of the device, historical performance data associated with the device and the like. The predicted life period 308, alone or in combination with the current operating state 306, may be the basis for the first variable 432, as well as, the predicted time for replacement 444.

In other embodiments of the invention, the performance data 304 may be acquired over time and analyzed by the device performance module 410 to determine a performance trend 312. The performance trend 312 indicates that the condition of the device 300 may be improving or degrading. In this regard, for example, maintenance may have been or is continually being performed on the device 300 which would result in the performance trend 312 indicating an improving condition of the device 300 or, conversely, lack of maintenance or wear on the device 300 would result in the performance trend 312 indicating a degrading condition of the device 300. The performance trend 312, alone or in combination with the current operating state 306, may be the basis for the first variable 432, as well as, the predicted time for replacement 444.

As previously discussed in relation to FIG. 1, the memory 404 of apparatus 400 stores replacement schedule module 410 that is configured to determine a replacement schedule 434 for each of the interrelated communication devices 300. The replacement schedule is configured to include a dynamic user-specific replacement rate/amount 442 that may be offered to the user, as well as, a predicted time for replacement 444, which may be the current time or a time in the future. As previously discussed the replacement rate/amount 442 is determined by applying the first variable 432 to a first fixed rate 436. The first variable 432 may be based at least in part on one or more of the current operating state 302, the predicted life period 308 and/or the performance trend 312 of the interrelated communication device 300. The first variable defines the variance (percentage or the like) in the user-specific replacement rate/amount 442 that may be afforded/offered to the user. The first fixed rate may the conventional/standard replacement rate/amount (e.g., manufacturer's suggested retail price or the like) offered by the entity (e.g., retailer, financial institution or the like) implementing the system 100/apparatus 400 herein described.

As previously discussed, other factors/attributes 314, in addition to the current operating state 302, the predicted life period 308 and/or the performance trend 312 of the interrelated communication device 300, may be taken into account in determining the first variable 432. Other factors 314 may be related to the interrelated communication device, the environment in which the device operates, the user, user demographics and the like. In such embodiments of the invention, the other factors 314 related to the interrelated communication may include, but are not limited to, the make, model, year of manufacturer of the device, as well as performance history of the make and/or model. Other factors 314 related to the operating environment may include, but are not limited to, physical address (i.e., the area of the world, country that the device is operating in), temperature profiles, number of users of the device and the like. Additionally, other factors 314 related to the user may include, but are not limited to, profile data, such as financial institution-related profile data; transaction data (i.e., previous purchase history of similar devices and the like) and other factors 314 associated with user demographics, which may include similar replacement buying patterns of similarly situated/profiled users. Such information may be communicated via the interrelated communication device 300 or may be accessed/communicated from other databases accessible via the distributed communication network 200.

Additionally, replacement schedule module 410 may be configured to determine a first time 438 at which the first variable 432 should be determined based on the predicted life period 308 of the interrelated communication device 300. The time 438 at which the first variable should be determined may coincide with the time at which the replacement rate/amount 442 should be determined. The time 438 takes into account that an optimal time exists for determining the replacement rate/amount 442 and, the fact that the first fixed rate 436 may fluctuate over time due to inflation, newer model replacements and the like. In addition, replacement schedule module 410 may be configured to determine a second time 440 at which the replacement schedule 434 should be determined based on the predicted life period 308 of the and/or the predicted time for replacement 444 interrelated communication device 300. In specific embodiments of the invention, the time 440 at which the replacement schedule 434 should be determined coincides with the time at which an offer is made to the user of the device 300, which may or may not coincide with the predicted time for replacement 444 of the device. (i.e., in some instances, offers may be desired to be made to a user well in advance of the predicted time for replacement, while in other instances offers may be desired to be made concurrent with the actual time for replacement). Other factors, besides the predicted life period 308 may be used in determining the first and/or second times 438, 440 for determining the first variable 432 and/or the replacement schedule 434 (i.e., the time at which an offer should be made to the user).

According to specific embodiments of the invention, the memory 450 of apparatus 400 may additionally store warranty module 450 that is configured to determine a dynamic user-specific warranty rate 454 for each of the existing interrelated communication devices 300. The warranty rate/amount 454 is determined by applying a second variable 452 to a second fixed rate 456. The second variable 452 is determined by the warranty module 450 based, at least in part on, the current operating state 302 and the usage/use period of time 310 of the interrelated communication device. In other embodiments of the invention, the warranty module 450 may rely on the predicted life period 308 and/or the performance trend 312 of the interrelated communication device 300, alone or in combination with the current operating state 302 and the usage/use period of time 310, to determine the second variable 452. The second variable 452 defines the variance (percentage or the like) in the user-specific warranty rate/amount 454 that may be afforded/offered to the user. The second fixed rate may the conventional/standard warranty rate/amount for the existing device 300 offered by the entity (e.g., warrantor, retailer, financial institution or the like) implementing the system 100/apparatus 400 herein described.

Similar to the first variable 432 discussed above, other factors/attributes (not shown in FIG. 2), in addition to the current operating state 302, the predicted life period 308 and/or the performance trend 312 of the interrelated communication device 300, may be taken into account in determining the second variable 452. Other factors may be related to the interrelated communication device, the environment in which the device operates, the user, user demographics and the like.

In addition, warranty module 450 may be configured to determine a dynamic user-specific warranty rate for each of the replacement devices. The warranty rate/amount for the replacement devices is determined by applying a third variable to a third fixed rate. The third variable is determined by the warranty module 450 based, at least in part on, the current operating state 302 and the usage/use period of time 310 of the interrelated communication device. (i.e., the warranty rate/amount afforded the user for the replacement device takes into how well the user maintained or how harsh the user was on the existing device 300). In other embodiments of the invention, the warranty module 450 may rely on the predicted life period 308 and/or the performance trend 312 of the interrelated communication device 300, alone or in combination with the current operating state 302 and the usage/use period of time 310, to determine the third variable. The third variable defines the variance (percentage or the like) in the user-specific warranty rate/amount that may be afforded/offered to the user for warranting the replacement device. The third fixed rate may the conventional/standard warranty rate/amount for the replacement device offered by the entity (e.g., warrantor, retailer, financial institution or the like) implementing the system 100/apparatus 400 herein described.

Referring to FIG. 3 a flow diagram is depicted of a method 500 for determining a replacement schedule for an interrelated communication device, in accordance with embodiments of the present invention. At Event 510, a plurality of interrelated communication devices disposed across a distributed communication network, such as the Internet and the like, are in communication with an apparatus configured for determining a replacement schedule. In accordance with embodiments of the invention, each of the interrelated communication devices include at least one sensor that captures performance data and communicates the performance data via the distributed communication network. In this regard, the interrelated communication devices may be referred to as Internet-of-Things (IoT) devices.

At Event 520, performance data, communicated from the interrelated communication devices is received. The performance data may be self-diagnostic data, such as acquired by an automobile, and/or household appliances or the performance data may include data that indicates the period of device usage (i.e., how many minutes, hours and the like the device has been in use). In addition, the performance data 304 may include other data associated with performance, such as operating temperatures, energy consumption, rate of consumption of replaceable sub-components and the like.

At Event 530, the performance data is analyzed to determine a current operating state of each of the interrelated communication devices. In specific embodiments of the invention the performance data is analyzed to determine a current operating state in relation to a current usage period or frequency of use. The current operating state may be a pre-defined level or numeric value that defines the current operating condition of the device. In other embodiments of the invention, the performance data is analyzed to determine a predicted future life/usage period and/or a performance trend for one or more of the interrelated communication devices At Event 540, a first variable associated with replacing a corresponding interrelated communication device is determined based, at least on the one or more of the current operating state, the predicted future life and/or performance trend. The first variable defines the variance (percentage or the like) in the replacement rate/amount that may be afforded the user based at least on one or more of the current operating state, the predicted future life period or the performance trend of the interrelated communication device. Other factors/attributes, in addition to the current operating state, predicted future life period and/or performance trend of the interrelated communication device, may be taken into account in determining the first variable. Other factors may be related to the interrelated communication device, the environment in which the device operates, the user, user demographics and the like.

At Event 550, a replacement schedule is determined for replacing a corresponding one of the interrelated devices. In specific embodiments of the invention, the replacement schedule may include a replacement rate/amount that may be offered to a user of the interrelated communication device and a predicted time for replacement. The dynamic user-specific replacement rate/amount may be determined by applying the first variable to a first fixed rate. The first fixed rate may be standard/conventional baseline rate amount for the replacement device. The predicted time for replacement may be determined based on the current operating state of the device and the predicted future use period for the device.

Additionally, other factors related to the device and/or the user may be considered in determining the predicted time for replacement.

In addition to determining the replacement schedule, optional embodiments of the method, include determining a warranty rate for the existing interrelated device and/or the replacement device. The dynamic user-specific warranty rates may be determined by applying a different variable to a fixed warranty rate. The warrant variable may be determined based at least in part on the one or more of the current operating state in relation to the current usage/usage period, the predicted future life period or the performance trend of the interrelated communication device. Other factors/attributes, in addition to the current operating state, predicted future life period and/or performance trend of the device may be relied on to determine the warranty variable.

Thus, systems, apparatus, methods, and computer program products described above provide for analyzing performance data received from interrelated communication devices, such as devices interconnected via IoT, and based on the performance data determining a variable associated with replacing the device, warranting the device and/or warranting the replacement device. Based on the replacement variable, a dynamic user-specific replacement schedule is determined that takes into account a time for replacing the device and/or an amount associated with replacing the device. Further, based on the warranty variable, dynamic user-specific warranty rates are determined, for the existing device and/or replacement device, which takes into account the current operating state of the device in relation to how the device has been in use.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for analyzing performance data from interrelated communication devices, the system comprising:
   a computer platform including, a memory, a processor in communication with the memory and a network communication device in communication with the processor;
   a device performance analysis module stored in the memory, executable by the processor, and configured for:
      communicating with a plurality of interrelated communication devices across a distributed computing network, wherein each of the interrelated computing devices include at least one sensor that captures performance data and communicates the performance data via the distributed network,
      receiving the performance data captured by the at least one sensor and communicated from the one or more of the interrelated communication devices,
      analyzing the performance data to (i) determine a current operating state and (ii) predict a useful life period for each of the one or more interrelated communication devices;
   a replacement schedule determining module stored in the memory, executable by the processor, and configured for:
      determining a first time for determining a first variable and a replacement rate for each of the one or more interrelated communication devices,
      determining a second time for determining a replacement schedule based on the predicted useful life period for each of the one or more interrelated communication devices,
      determining, at the first time, the first variable for each of the one or more interrelated communication devices, wherein the first variable is associated with replacing each of the interrelated communication devices based on the determined current operating state and the predicted useful life period of each of the one or more interrelated communication devices,
      determining, at the first time, the replacement rate for each of the one or more interrelated communication devices, by applying the first variable to a first fixed rate, wherein the first fixed rate is associated with a same one of the one or more interrelated communication devices as a corresponding first variable, and
      determining, at the second time, the replacement schedule for replacing each of the one or more interrelated communication devices, wherein the replacement schedule defines a time at which the replacement rate is made available to a user of a corresponding one of the one or more interrelated communication devices.

2. The system of claim 1, wherein the replacement schedule module is further configured for determining the first variable based on the predicted useful life period for each of the one or more interrelated communication devices.

3. The system of claim 1, wherein the device performance analysis module is further configured for analyzing the performance data to determine the current operating state of each of the one or more interrelated communication devices in relation to a period of time that each of the one or more interrelated communication devices have been in use.

4. The system of claim 3, further comprising a warranty module stored in the memory, executable by the processor and configured for:
   determining a second variable for each of the one or more interrelated communication devices, wherein the second variable is associated with warranting each of the devices based on the determined current operating state of each of the one or more interrelated communication devices in relation to the period of time, and
   determining a first warranty rate for warranting each of the one or more interrelated communication devices by applying the second variable to a second fixed rate, wherein the second fixed rate is associated with a same one of the one or more interrelated communication devices as a corresponding second variable.

5. The system of claim 4, wherein the warranty module is further configured for:
   determining a third variable for each of the one or more interrelated communication devices, wherein the third variable is associated with warranting a replacement device for a corresponding one of the one or more interrelated communication devices based on the determined current operating state of each of the interrelated communication devices in relation to the period of time, and determining a second warranty rate for warranting a replacement device for each of the one or more interrelated communication devices by applying the third variable to a third fixed rate, wherein the third fixed rate is associated with a same one of the one or more interrelated communication devices as a corresponding third variable.

6. The system of claim 1, wherein the device performance analysis module is further configured for:

analyzing the performance data over time to determine a performance trend for each of the one or more interrelated communication devices, wherein the replacement schedule module is further configured for:

determining the first variable for each of the one or more interrelated communication devices, wherein the first variable is associated with replacing each of the interrelated communication devices based on the determined performance trend of each of the one or more interrelated communication devices.

7. A method for analyzing performance data from interrelated communication devices, the method comprising:

communicating with a plurality of interrelated communication devices across a distributed computing network, wherein each of the interrelated computing devices include at least one sensor that captures performance data and communicates the performance data via the distributed network;

receiving, by a computing device processor, the performance data communicated from the one or more of the interrelated communication devices;

analyzing, by a computing device processor, the performance data to (i) determine a current operating state and (ii) predict a useful life period for of each of the one or more interrelated communication devices;

determining, by a computing device processor, a first time for determining a first variable and a replacement rate for each of the one or more interrelated communication devices determining a second time for determining a replacement schedule based on the predicted useful life period for each of the one or more interrelated communication devices;

determining, at the first time, by a computing device processor, the first variable for each of the one or more interrelated communication devices, wherein the first variable is associated with replacing each of the interrelated communication devices based on the determined current operating state and the predicted useful life period of each of the one or more interrelated communication devices;

determining, at the first time, by a computing device processor, the replacement rate for each of the one or more interrelated communication devices, by applying the first variable to a first fixed rate, wherein the first fixed rate is associated with a same one of the one or more interrelated communication devices as a corresponding first variable; and determining, at the second time, by a computing device processor, the replacement schedule for replacing each of the one or more interrelated communication devices, wherein the replacement schedule defines a time at which the replacement rate is made available to a user of a corresponding one of the one or more interrelated communication devices.

8. The method of claim 7, wherein the determining the first variable further comprises determining, by the computing device processor, the first variable based on the predicted useful life period for each of the one or more interrelated communication devices.

9. The method of claim 7, wherein analyzing the performance data further comprises analyzing, by the computing device processor, the performance data to determine the current operating state of each of the one or more interrelated communication devices in relation to a period of time that each of the one or more interrelated communication devices have been in use.

10. The method of claim 9, further comprising:

determining, by a computing device processor, a second variable for each of the one or more interrelated communication devices, wherein the second variable is associated with warranting each of the devices based on the determined current operating state of each of the one or more interrelated communication devices in relation to the period of time, and determining, by a computing device processor, a first warranty rate for warranting each of the one or more interrelated communication devices by applying the second variable to a second fixed rate, wherein the second fixed rate is associated with a same one of the one or more interrelated communication devices as a corresponding second variable.

11. The method of claim 7, wherein analyzing the performance data further comprises monitoring, by the computing device processor, the performance data over time to determine a performance trend for each of the one or more interrelated communication devices, and wherein determining the first variable further comprises determining, by the computing device processor, the first variable for each of the one or more interrelated communication devices, wherein the first variable is associated with replacing each of the interrelated communication devices based on the determined performance trend of each of the one or more interrelated communication devices.

12. A computer program product for analyzing performance data from interrelated communication devices comprising a non-transitory computer-readable storage medium having computer-executable instructions for:

communicating with a plurality of interrelated communication devices across a distributed computing network, wherein each of the interrelated computing devices include at least one sensor that captures performance data and communicates the performance data via the distributed network;

receiving the performance data communicated from the one or more of the interrelated communication devices;

analyzing the performance data to determine (i) a current operating state and (ii) predict a useful life period for of each of the one or more interrelated communication devices;

determining a first time for determining a first variable and a replacement rate for each of the one or more interrelated communication devices;

determining a second time for determining a replacement schedule based on the predicted useful life period for each of the one or more interrelated communication devices;

determining, at the first time, the first variable for each of the one or more interrelated communication devices, wherein the first variable is associated with replacing each of the interrelated communication devices based on the determined current operating state and the predicted useful life period of each of the one or more interrelated communication devices;

determining, at the first time, by a computing device processor, the replacement rate for each of the one or more interrelated communication devices, by applying the first variable to a first fixed rate, wherein the first fixed rate is associated with a same one of the one or more interrelated communication devices as a corresponding first variable; and determining, at the second time, the replacement schedule for replacing each of the one or more interrelated communication devices, wherein the replacement schedule defines a time at which the replacement rate is made available to a user of a corresponding one of the one or more interrelated communication devices.

13. The computer program product of claim 12, wherein the instructions for determining the first variable further comprise instructions for determining the first variable based on the predicted useful life period for each of the one or more interrelated communication devices.

* * * * *